(12) United States Patent
Honda

(10) Patent No.: US 9,007,614 B2
(45) Date of Patent: Apr. 14, 2015

(54) PRINTING SYSTEM INCLUDING A PRINTING APPARATUS AND AN INFORMATION PROCESSING APPARATUS WHICH COMMUNICATES WITH THE PRINTING APPARATUS

(75) Inventor: Hideki Honda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 429 days.

(21) Appl. No.: 13/367,030

(22) Filed: Feb. 6, 2012

(65) Prior Publication Data

US 2012/0212777 A1    Aug. 23, 2012

(30) Foreign Application Priority Data

Feb. 21, 2011    (JP) ................. 2011-035183

(51) Int. Cl.
*G06K 15/00* (2006.01)
*G06F 3/12* (2006.01)

(52) U.S. Cl.
CPC .............. *G06F 3/1236* (2013.01); *G06F 3/121* (2013.01); *G06F 3/1259* (2013.01); *G06F 3/1274* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 6,734,985 B1 * | 5/2004 | Ochiai | 358/1.15 |
| 7,423,772 B2 | 9/2008 | Honda et al. | |
| 2006/0187481 A1 * | 8/2006 | Hayakawa | 358/1.14 |
| 2006/0221375 A1 * | 10/2006 | Nagarajan et al. | 358/1.14 |
| 2008/0114959 A1 * | 5/2008 | Nitta | 711/164 |
| 2010/0220354 A1 | 9/2010 | Honda | |

FOREIGN PATENT DOCUMENTS

| | | |
|---|---|---|
| JP | 2001-22546 A | 1/2001 |
| JP | 2004-341734 A | 12/2004 |

* cited by examiner

*Primary Examiner* — Benny Q Tieu
*Assistant Examiner* — Sunil Chacko
(74) *Attorney, Agent, or Firm* — Fitzpatrick, Cella, Harper & Scinto

(57) ABSTRACT

A printing system comprising a printing apparatus and an information processing apparatus, the information processing apparatus comprises a unit configured to transmit a status acquisition request to the printing apparatus, and the printing apparatus comprises: a timeout processing unit configured to manage a timeout of a job to be processed; a determination unit configured to determine whether the status acquisition request contains an identifier of the job; and a unit configured not to reset a lapse of the timeout time of the job by the timeout processing unit when the determination unit determines that the status acquisition request does not contain the identifier of the job, and to reset the lapse of the timeout time of the job by the timeout processing unit when the determination unit determines that the status acquisition request contains the identifier of the job.

8 Claims, 15 Drawing Sheets

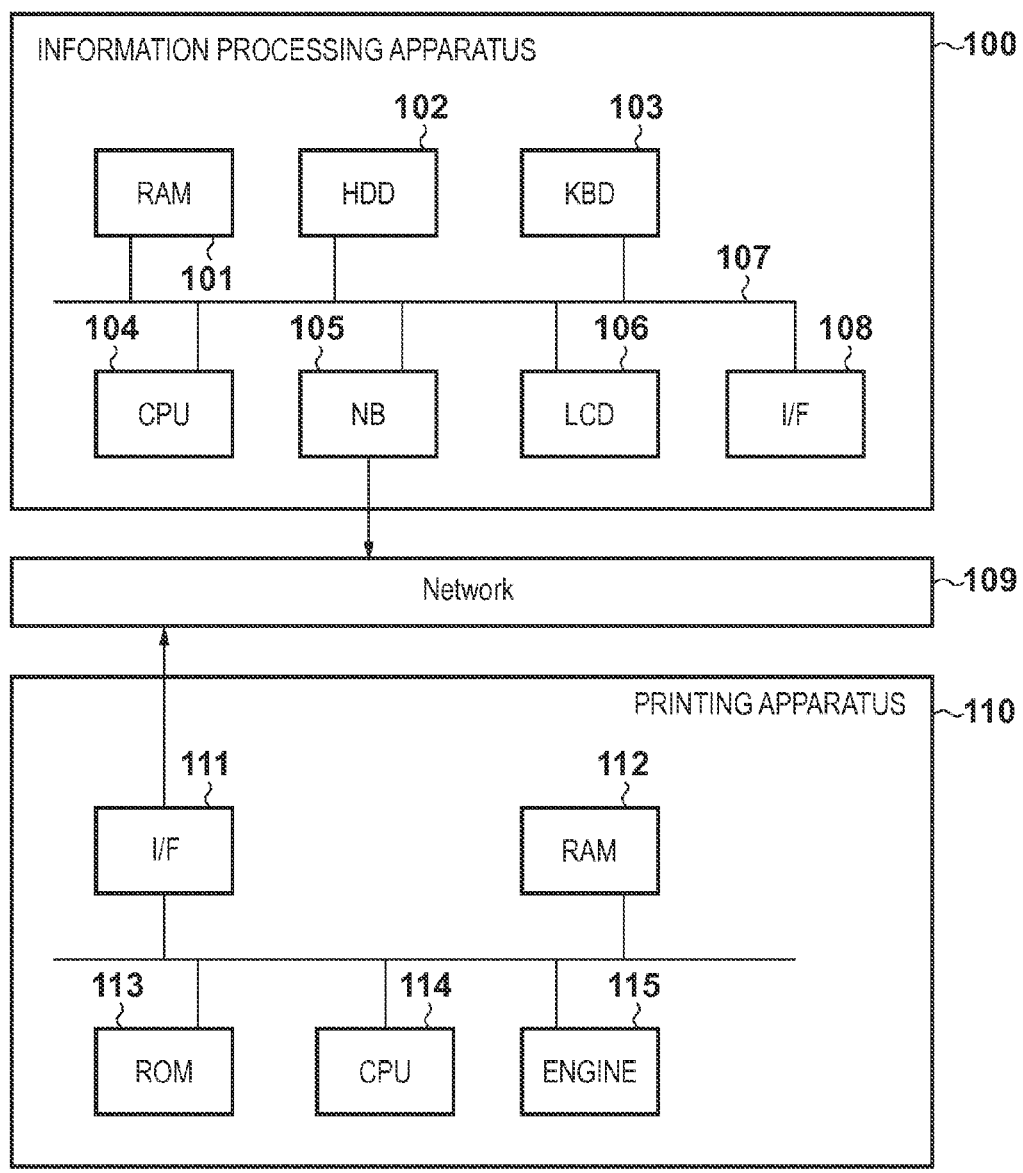

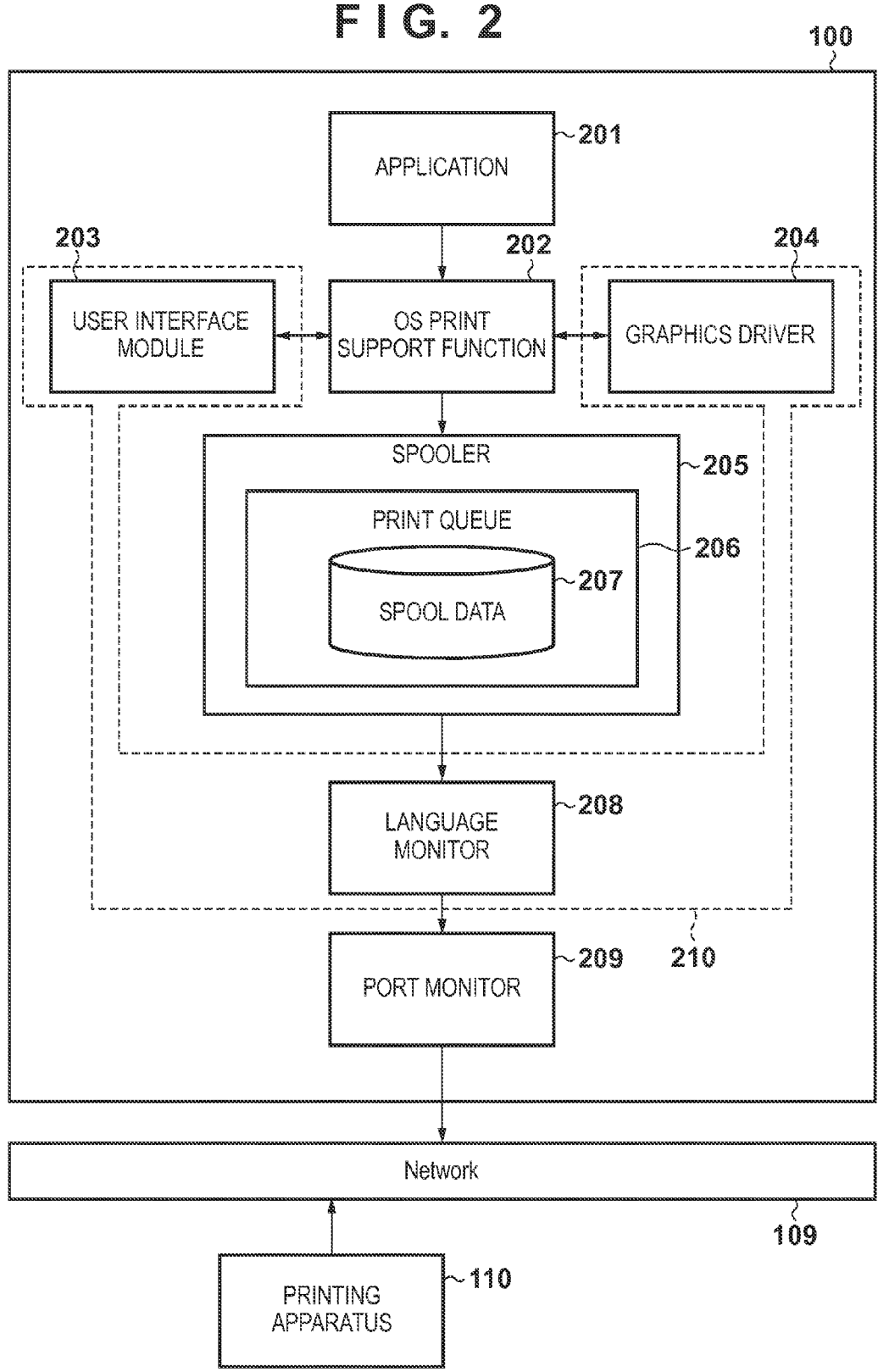

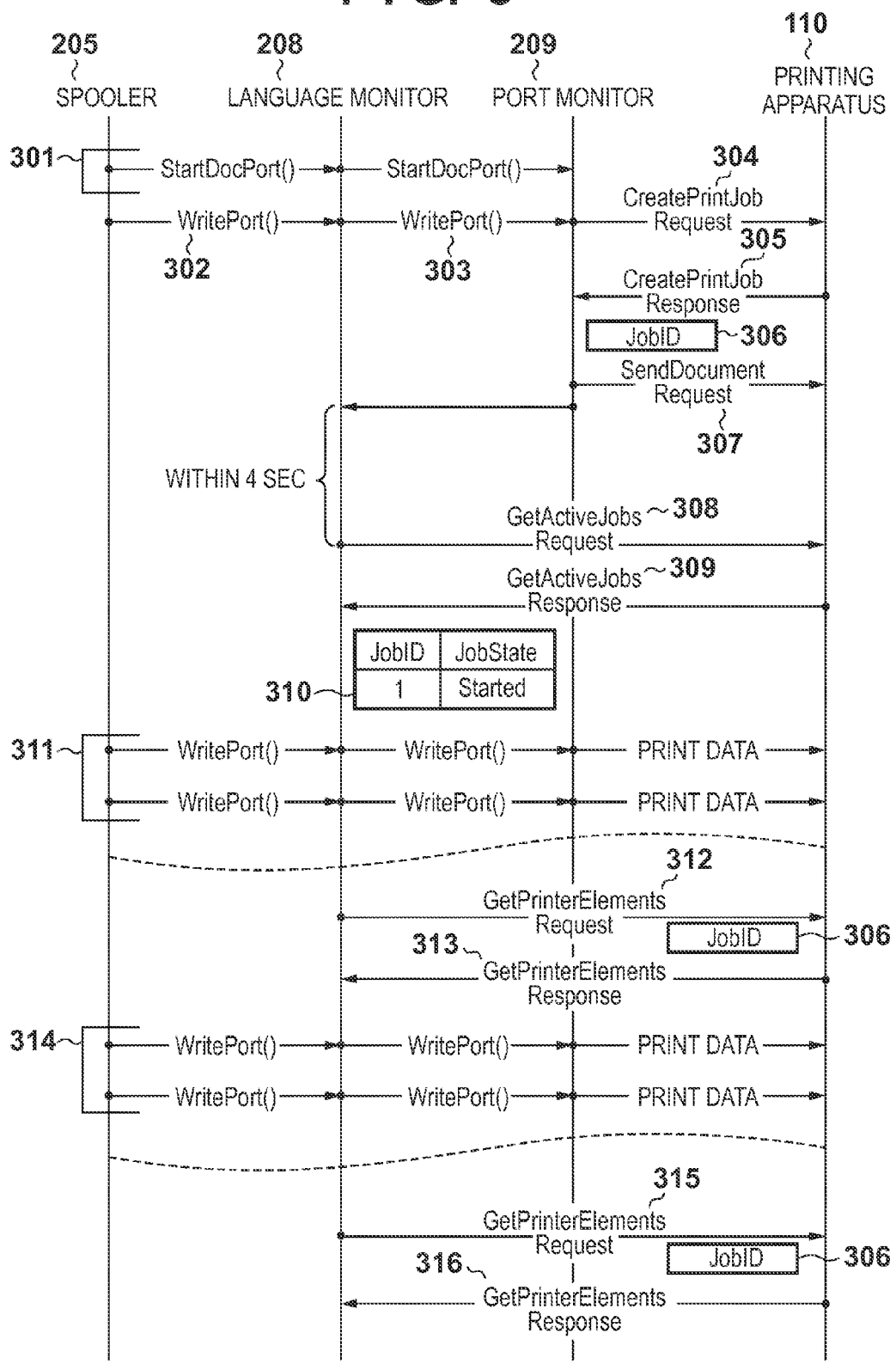

FIG. 4A

| JobID | JobState |
|---|---|
| 1 | Started |

FIG. 4B

| JobID | JobState |
|---|---|
| 1 | Printing |

FIG. 4C

| JobID | JobState |
|---|---|
| 1 | Completed |

```
<wprt:GetActiveJobsResponse>
    <wprt:ActiveJobs>
        <wprt:JobSummary>
            <wprt:JobId>1</wprt:JobId>
            <wprt:JobState>Started</wprt:JobState>         ~700
            <wprt:JobName>Job 1</wprt:JobName>
        </wprt:JobSummary>
    </wprt:ActiveJobs>
</wprt:GetActiveJobsResponse>
```

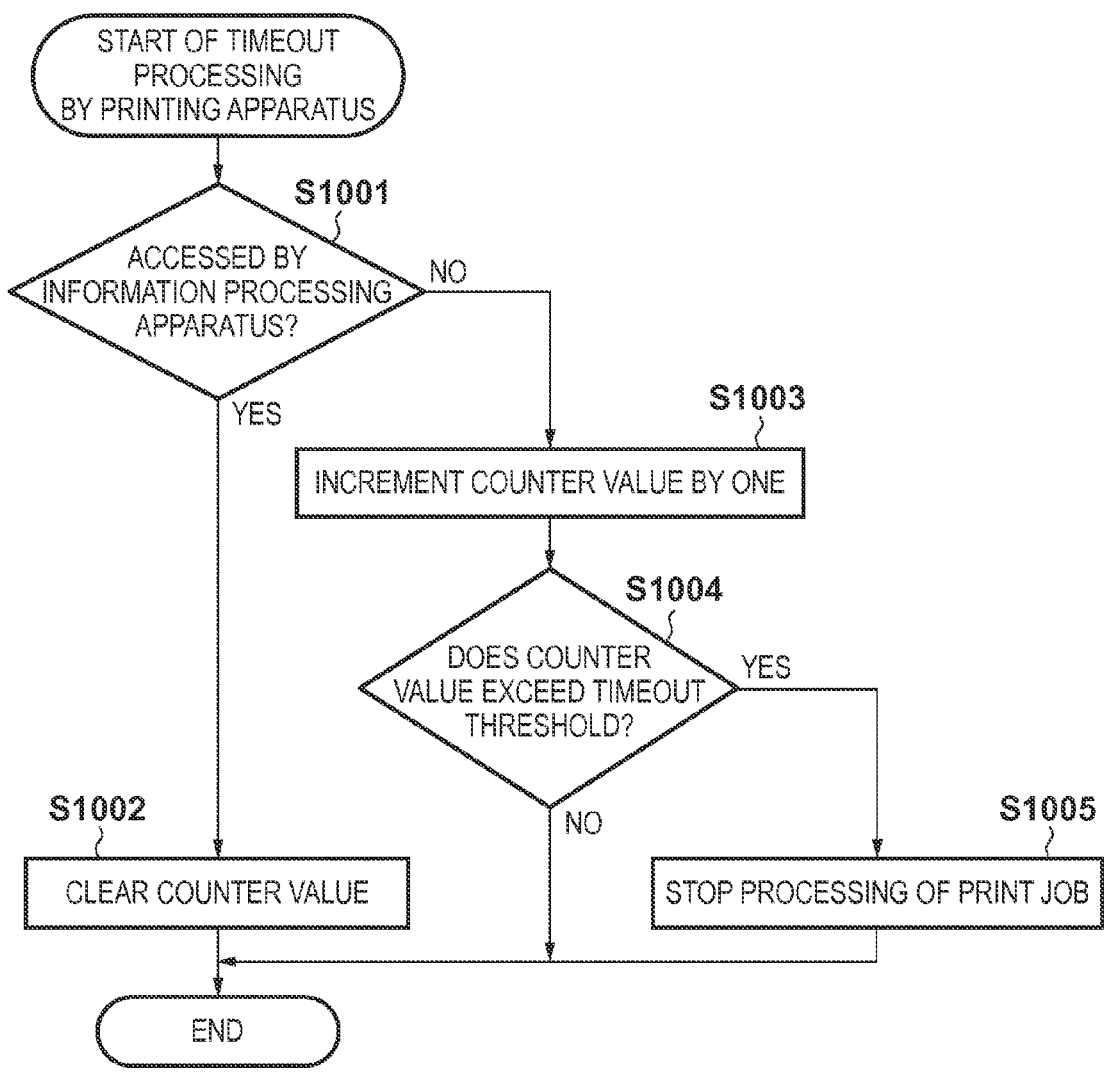

FIG. 11A

```
<wprt:GetPrinterElementsRequest>
    <wprt:RequestedElements>
        <wprt:Name>wprt:PrinterConfiguration</wprt:Name>
        <wprt:Name>wprt:JobId</wprt:Name>          ~1100
        <wprt:JobId>1</wprt:JobId>
    </wprt:RequestedElements>
</wprt:GetPrinterElementsRequest>
```

FIG. 11B

```
<wprt:GetPrinterElementsRequest>
    <wprt:RequestedElements>
        <wprt:Name>wprt:PrinterConfiguration</wprt:Name>
        <wprt:Name>wprt:JobId</wprt:Name>          ~1101
        <wprt:JobId>Invalid</wprt:JobId>
    </wprt:RequestedElements>
</wprt:GetPrinterElementsRequest>
```

F I G. 11C

```
<wprt:GetPrinterElementsResponse>
    <wprt:PrinterElements>
        <wprt:ElementData Name="wprt:PrinterConfiguration" Valid="true">
            <wprt:PrinterConfiguration>
                <wprt:Storage>
                    <wprt:StorageEntry Name="BaseRAM">
                        <wprt:Type>RAM</wprt:Type>
                        <wprt:Size>32768</wprt:Size>
                        <wprt:Free>80</wprt:Free>
                    </wprt:StorageEntry>
                </wprt:Storage>
                <wprt:Consumables>
                    <wprt:ConsumableEntry Name="InkSlot1">
                        <wprt:Type>Ink</wprt:Type>
                        <wprt:Color>Black</wprt:Color>
                        <wprt:Level>40</wprt:Level>
                        <wprt:Model>HiCapacityBlack</wprt:Model>
                    </wprt:ConsumableEntry>
                    <wprt:ConsumableEntry Name="InkSlot2">
                        <wprt:Type>Ink</wprt:Type>
                        <wprt:Color>Yellow</wprt:Color>
                        <wprt:Level>80</wprt:Level>
                        <wprt:Model>HiCapacityYellow</wprt:Model>
                    </wprt:ConsumableEntry>
                    <wprt:ConsumableEntry Name="InkSlot3">
                        <wprt:Type>Ink</wprt:Type>
                        <wprt:Color>Cyan</wprt:Color>
                        <wprt:Level>20</wprt:Level>
                        <wprt:Model>StarterCyan</wprt:Model>
                    </wprt:ConsumableEntry>
```

FIG. 11D

```
            <wprt:ConsumableEntry Name="InkSlot4">
                <wprt:Type>Ink</wprt:Type>
                <wprt:Color>Magenta</wprt:Color>
                <wprt:Level>50</wprt:Level>
                <wprt:Model>WaterproofMagenta</wprt:Model>
            </wprt:ConsumableEntry>
        </wprt:Consumables>
        <wprt:InputBins>
            <wprt:InputBinEntry Name="Tray1">
                <wprt:FeedDirection>ShortEdgeFirst</wprt:FeedDirection>
                <wprt:MediaSize>na_legal_8.5x14in</wprt:MediaSize>
                <wprt:Capacity>500</wprt:Capacity>
                <wprt:Level>70</wprt:Level>
            </wprt:InputBinEntry>
        </wprt:InputBins>
        <wprt:Finishings>
            <wprt:CollationSupported>false</wprt:CollationSupported>
            <wprt:JogOffsetSupported>true</wprt:JogOffsetSupported>
            <wprt:DuplexerInstalled>true</wprt:DuplexerInstalled>
            <wprt:StaplerInstalled>false</wprt:StaplerInstalled>
            <wprt:HolePunchInstalled>false</wprt:HolePunchInstalled>
        </wprt:Finishings>
        <wprt:OutputBins>
            <wprt:OutputBinEntry Name="Bin1">
                <wprt:Capacity>100</wprt:Capacity>
                <wprt:Level>-1</wprt:Level>
            </wprt:OutputBinEntry>
        </wprt:OutputBins>
    </wprt:PrinterConfiguration>
  </wprt:ElementData>
 </wprt:PrinterElements>
</wprt:GetPrinterElementsResponse>
```

FIG. 14A

```
<wprt:GetPrinterElementsRequest>
    <wprt:RequestedElements>
        <wprt:Name>wprt:PrinterConfiguration</wprt:Name>
        <wprt:Name>wprt:JobId</wprt:Name>
        <wprt:JobId>200</wprt:JobId>
    </wprt:RequestedElements>
</wprt:GetPrinterElementsRequest>
```

FIG. 14B

```
<wprt:GetPrinterElementsRequest>
    <wprt:RequestedElements>
        <wprt:Name>wprt:PrinterConfiguration</wprt:Name>
        <wprt:Name>wprt:JobId</wprt:Name>
        <wprt:JobId>Invalid</wprt:JobId>
    </wprt:RequestedElements>
</wprt:GetPrinterElementsRequest>
```

PRINTING SYSTEM INCLUDING A PRINTING APPARATUS AND AN INFORMATION PROCESSING APPARATUS WHICH COMMUNICATES WITH THE PRINTING APPARATUS

BACKGROUND OF THE INVENTION

1. Field of the Invention

The present invention relates to a printing system which controls timeout processing of a network-connected printing apparatus.

2. Description of the Related Art

Recently, Windows 7® OS (Operating System) available from Microsoft, USA adopts WSD (Web Service on Device) as a method for printing by a network-connected printing apparatus. Detailed information of WSD is laid open to the public in "Windows Hardware Developer Central" by Microsoft Corporation [online] [searched on Oct. 11, 2010] on the Internet (URL: http://www.microsoft.com/whdc/connect/rally/rallywsd.mspx). To avoid occupying a network-connected printing apparatus when printing by a network-connected printing apparatus, there has conventionally been proposed a technique of releasing occupation of the printing apparatus by performing timeout processing unless an information processing apparatus which has transmitted a print job accesses the printing apparatus for a predetermined period.

There is also disclosed processing in which a printing apparatus analyzes a print start request, if no error has occurred, creates a port, and if the port has not been accessed for a predetermined period, closes the port (see Japanese Patent Laid-Open No. 2004-341734).

For example, in manual printing, transmission of print data to a printing apparatus may intentionally stop so that the printer driver can display a manual printing guide dialog. Even in this case, there is a technique of preventing generation of a timeout error by periodically inquiring status information of a printing apparatus.

As a general OS print support function, there is a method of, when a network cable connected to an information processing apparatus is plugged out and plugged in, deleting a print job during printing and newly printing again a job of the same contents. For example, when the network cable is plugged out and plugged in during printing of job 1, the print support function deletes job 1 held in the print queue, and newly generates and prints a job of the same contents as job 2.

At this time, the printing apparatus cannot detect the plug-out and plug-in of the network cable connected to the information processing apparatus, and keeps processing job 1. The port monitor of the information processing apparatus issues a job 2 print start request to the printing apparatus. However, the printing apparatus is processing job 1 and thus sends back an error response. The language monitor of the information processing apparatus issues a status acquisition request to the printing apparatus. Because of access from the information processing apparatus, the printing apparatus resets the timeout processing counter. As a result, no timeout occurs, and the printing apparatus keeps processing job 1 and cannot start processing of job 2 for a predetermined period.

SUMMARY OF THE INVENTION

According to one aspect of the present invention, there is provided a printing system comprising a printing apparatus and an information processing apparatus which communicates with the printing apparatus, the information processing apparatus comprising a transmission unit configured to transmit a status acquisition request to the printing apparatus, and the printing apparatus comprising: a timeout processing unit configured to manage a timeout of a job to be processed; a determination unit configured to determine whether the status acquisition request contains an identifier of the job; and a reset unit configured not to reset a lapse of the timeout time of the job by the timeout processing unit when the determination unit determines that the status acquisition request does not contain the identifier of the job, and to reset the lapse of the timeout time of the job by the timeout processing unit when the determination unit determines that the status acquisition request contains the identifier of the job.

According to another aspect of the present invention, there is provided a printing apparatus comprising: a timeout processing unit configured to manage a timeout of a job to be processed; a determination unit configured to determine whether a status acquisition request transmitted from an information processing apparatus contains an identifier of the job; and a reset unit configured not to reset a lapse of the timeout time of the job by the timeout processing unit when the determination unit determines that the status acquisition request does not contain the identifier of the job, and to reset the lapse of the timeout time of the job by the timeout processing unit when the determination unit determines that the status acquisition request contains the identifier of the job.

According to another aspect of the present invention, there is provided a non-transitory computer-readable medium storing a program for causing a computer to function as a timeout processing unit configured to manage a timeout of a job to be processed, a determination unit configured to determine whether a status acquisition request transmitted from an information processing apparatus contains an identifier of the job, and a reset unit configured not to reset a lapse of the timeout time of the job by the timeout processing unit when the determination unit determines that the status acquisition request does not contain the identifier of the job, and to reset the lapse of the timeout time of the job by the timeout processing unit when the determination unit determines that the status acquisition request contains the identifier of the job.

The printing apparatus can discriminate status requests from an information processing apparatus for respective jobs, and avoid erroneous resetting of a timeout processing counter in response to a status request for a job which is not currently processed by the printing apparatus.

Further features of the present invention will become apparent from the following description of exemplary embodiments (with reference to the attached drawings).

BRIEF DESCRIPTION OF THE DRAWINGS

FIG. 1 is a block diagram showing the configuration of a printing system including an information processing apparatus and printing apparatus;

FIG. 2 is a block diagram showing the configuration of a printing system according to the first embodiment;

FIG. 3 is a chart showing a print processing sequence;

FIGS. 4A, 4B, and 4C are tables each showing JobID and JobState;

FIG. 10 is a flowchart showing timeout processing by the printing apparatus;

FIGS. 11A, 11B, 11C and 11D are views exemplifying the structures of GetPrinterElements Request and GetPrinterElements Response;

FIGS. 14A and 14B are views each exemplifying the structure of GetPrinterElements Request.

DESCRIPTION OF THE EMBODIMENTS

Figure 5:
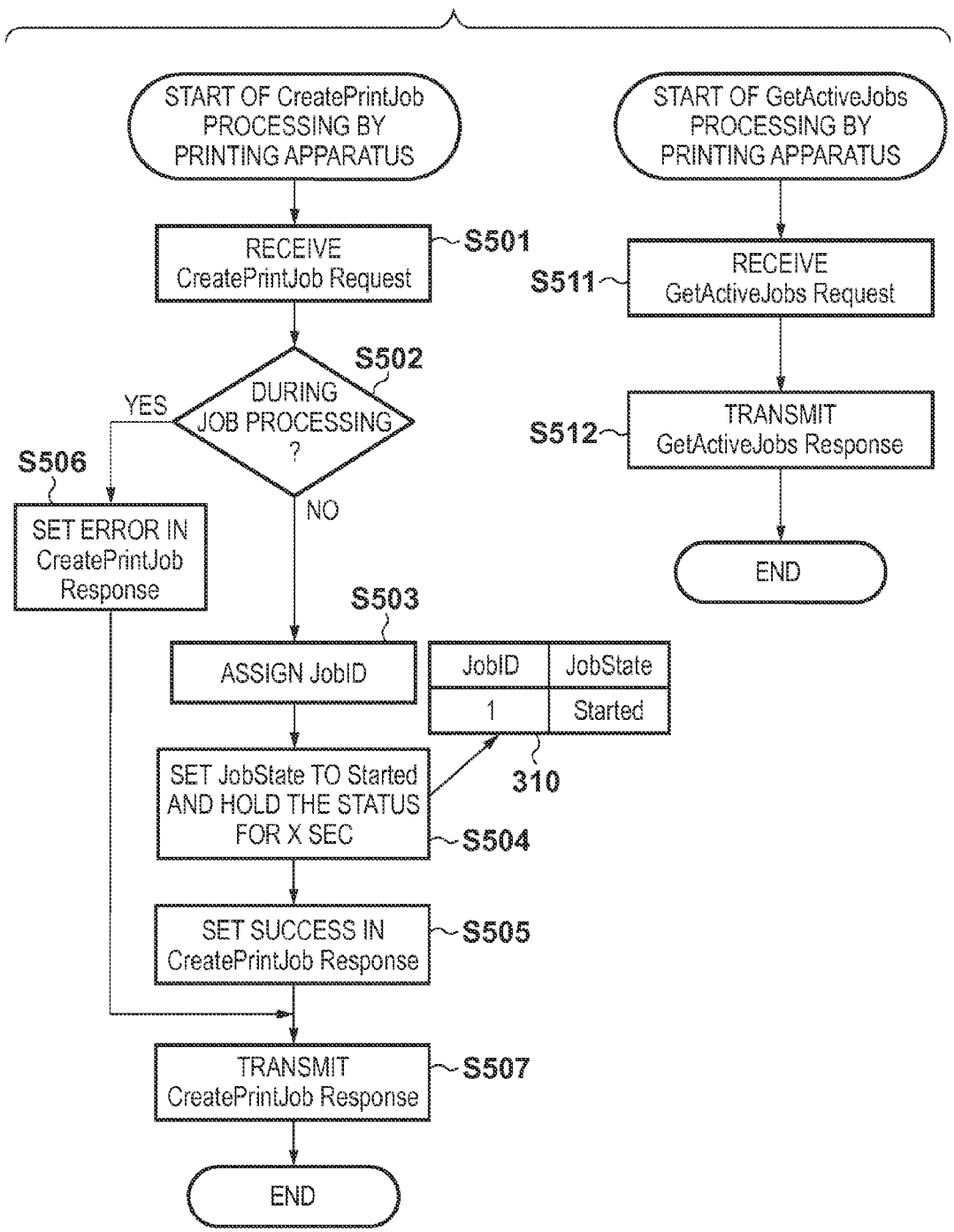
FIG. 5 is a flowchart showing processing by the printing apparatus.

Embodiments of the present invention will now be described in detail with reference to the accompanying drawings. It is to be understood that the following embodiments are not intended to limit the claims of the present invention, and that not all combinations of features described in the embodiments are indispensable for the method to solve the problems in the present invention.

<First Embodiment>

[System Arrangement]

The first embodiment according to the present invention will be explained with reference to FIGS. 1 to 12. Referring to FIG. 1, an information processing apparatus 100 has the arrangement of a general PC (Personal Computer). The information processing apparatus 100 includes a RAM 101, external storage device 102, keyboard 103, CPU 104, network board 105, display 106, and interface (I/F) 108.

Various programs stored in the external storage device 102 use the RAM 101 as a work memory. The external storage device 102 stores application programs, an OS (Operating System), a printer driver, and various other data. The keyboard 103 is used to input data or an operation instruction by the user. The display 106 is used to display data and notify the status. The network board 105 communicates with another device connected via a network 109. The interface 108 controls connection to a printing apparatus 110.

The printing apparatus 110 includes an interface (I/F) 111, RAM 112, ROM 113, CPU 114, and engine 115. The interface 111 is connected to the network 109, and communicates with another device similarly connected to the network. The ROM 113 stores control programs and the like. The CPU 114 controls the printing apparatus 110 in accordance with a control program stored in the ROM 113. The RAM 112 is used as the work memory of the CPU 114, and also used as a reception buffer for temporarily storing received data. The engine 115 prints data stored in the RAM 112. An inkjet engine will be explained as the engine 115 of the printing apparatus 110 in the embodiment. However, the present invention is not limited to this and, for example, an electrophotographic or thermal transfer engine is also applicable.

FIG. 2 is a block diagram showing a printing system applicable to the information processing apparatus 100 shown in FIG. 1. An application 201 acquires print setting information from a user interface module 203 via an OS print support function 202, and creates print data. The print data created by the application 201 is stored as a print job of spool data 207 in a print queue 206 of a spooler 205 via the OS print support function 202. The print job is transferred to a language monitor 208 via the spooler 205.

The language monitor 208 outputs the print job to a port monitor 209. The port monitor 209 transmits the print job transferred from the language monitor 208 to the printing apparatus 110 via the network 109. The embodiment assumes a WSD printing port monitor as the port monitor 209. However, the present invention is not limited to this, and various port monitors are usable as long as the present invention is applicable.

[WSD Print Processing]

FIG. 3 shows a print processing sequence in WSD printing. In a process 301, the spooler 205 calls a function StartDocPort( ) of the language monitor 208, and starts print processing. The language monitor 208 calls a function StartDocPort( ) of the port monitor 209. In a process 302, the spooler 205 calls a function WritePort( ) of the language monitor 208, and starts transmitting print data. In a process 303, the language monitor 208 calls a function WritePort( ) of the port monitor 209. In a process 304, the port monitor 209 transmits CreatePrintJob Request (print start request) to the printing apparatus 110.

In a process 305, the printing apparatus 110 sends back CreatePrintJob Response (print start response) together with JobID 306 to the port monitor 209. The JobID 306 used here is an ID (identifier) which is added to a print job to uniquely identify it in order to manage the print job by the printing apparatus 110. In a process 307, the port monitor 209 transmits SendDocument Request (document transmission request) to the printing apparatus 110, and completes processing of WritePort( ).

In a process 308, the language monitor 208 transmits GetActiveJobs Request to the printing apparatus 110 within a predetermined period after the completion of processing based on WritePort( ) of the port monitor 209. In a process 309, the printing apparatus 110 sends back GetActiveJobs Response to the language monitor 208. GetActiveJobs Response contains information (table 310) having JobID and JobState. Note that the embodiment will exemplify 4 sec as the predetermined period (X sec). Note that the time is not limited to this value and may be another setting value. Alternatively, the administrator may change the value, as needed.

In a process 311, the spooler 205 calls the function WritePort( ) of the language monitor 208 in order to transmit print data to the printing apparatus 110. Subsequently, the language monitor 208 calls the function WritePort( ) of the port monitor 209. The port monitor 209 transmits print data to the printing apparatus 110.

While print data is transmitted, the language monitor 208 transmits GetPrinterElements Request (status acquisition request) to the printing apparatus 110 in a process 312. GetPrinterElements Request contains the JobID 306. In a process 313, the printing apparatus 110 sends back GetPrinterElements Response (status acquisition response) to the language monitor 208. The system in the embodiment repeats the above-described processes until all print data are transmitted (processes 314, 315, and 316).

[JobID and JobState]

JobID and JobState serving as job information used in the above-described processes will be explained with reference to FIGS. 4A, 4B, and 4C. The printing apparatus 110 manages the status of a job during processing by using tables as shown in FIGS. 4A, 4B, and 4C. "JobID" is an ID (identifier) for uniquely identifying a job during processing. "JobState" represents the status of a job. Each job has JobID and JobState. Immediately after the printing apparatus 110 receives a job from the information processing apparatus 100, the job status is "Started", as shown in FIG. 4A. When the printing apparatus 110 processes and prints the job, the job status is "Printing", as shown in FIG. 4B. When the printing apparatus 110 completes printing of the job, the job status becomes "Completed", as shown in FIG. 4C. Note that the embodiment has exemplified the three job statuses, but another status may be defined.

[Operation Upon Receiving Request]

Operations when the printing apparatus 110 receives CreatePrintJob Request (process 304 in FIG. 3) and when it receives GetActiveJobs Request (process 308 in FIG. 3) will be explained in detail with reference to FIG. 5.

Upon receiving CreatePrintJob Request from the port monitor 209 (step S501), the printing apparatus 110 determines whether it is processing a job (step S502). If the printing apparatus 110 is not processing a job (NO in step S502), it assigns a new JobID corresponding to the received request (step S503). The printing apparatus 110 sets "Started" in JobState and holds the status for a predetermined time (X sec) (step S503). Assume that the predetermined time is defined in advance. In the embodiment, the status "Started" is maintained as a specific status for the predetermined time. At this time, JobID and JobState are set as represented by the table 310. The printing apparatus 110 sets information indicating "success" in CreatePrintJob Response (step S505). The printing apparatus 110 transmits CreatePrintJob Response to the port monitor 209 (step S507). The process ends.

If the printing apparatus 110 is processing a job (YES in step S502), it sets information indicating "error" in CreatePrintJob Response (step S506). The printing apparatus 110 transmits CreatePrintJob Response to the port monitor 209 (step S507). The process then ends.

The printing apparatus 110 receives GetActiveJobs Request from the language monitor 208 (step S511). After that, the printing apparatus 110 transmits, to the language monitor 208, GetActiveJobs Response containing JobID and JobState in the table 310 shown in FIG. 5 (step S512). The process then ends.

[Processing in WritePort( )]

Figure 6:
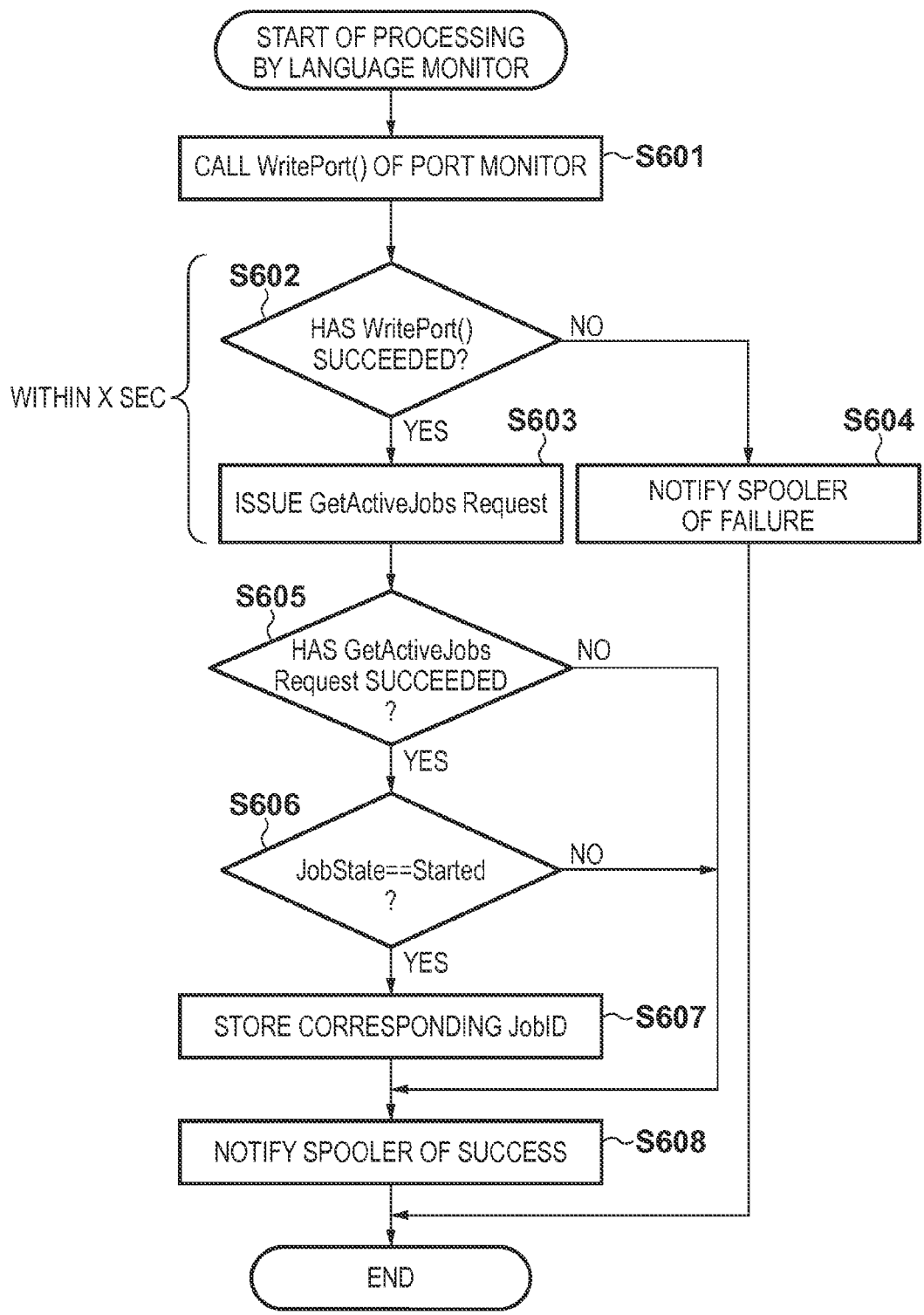
FIG. 6 is a flowchart showing processing by a language monitor.

FIG. 6 is a flowchart showing processing by the language monitor 208 when the spooler 205 calls the function WritePort( ) of the language monitor 208 in the process 302 of FIG. 3.

When the spooler 205 calls WritePort( ) of the language monitor 208, the language monitor 208 calls the function WritePort( ) of the port monitor 209 (step S601). If processing by WritePort( ) of the port monitor 209 has succeeded (YES in step S602), the language monitor 208 transmits GetActiveJobs Request to the printing apparatus 110 within a predetermined time (X sec) (step S603). Assume that the predetermined time is defined in advance.

If transmission of GetActiveJobs Request has succeeded and the printing apparatus 110 sends back GetActiveJobs Response (YES in step S605), the language monitor 208 determines whether the JobState value contained in GetActiveJobs Response is "Started" (step S606). By this processing, the job status is determined. If the JobState value is "Started" (YES in step S606), the language monitor 208 stores JobID in, for example, the RAM 101 serving as a storage unit (step S607). The language monitor 208 notifies the spooler 205 of the success (step S608). After that, the process ends.

Although not shown in FIG. 6, the language monitor 208 deletes JobID stored in step S607 after the end of print processing.

If WritePort( ) of the port monitor 209 has failed (NO in step S602), the language monitor 208 notifies the spooler 205 of the failure (step S604). Thereafter, the process ends. If GetActiveJobs Request has failed (NO in step S605) or the JobState value is not "Started" (NO in step S606), WritePort( ) of the port monitor 209 has succeeded. In this case, the language monitor 208 notifies the spooler 205 of the success (step S608). The process then ends.

[Structure of GetActiveJobs Response]

GetActiveJobs Response to be sent back from the printing apparatus 110 in step S309 of FIG. 3 will be explained with reference to FIG. 7. GetActiveJobs Response is a response from the printing apparatus 110 to GetActiveJobs Request transmitted from the information processing apparatus 100, and represents the status of a job which is processed by the printing apparatus 110. GetActiveJobs Response is described in the XML (eXtensible Markup Language) format. In a description 700 contained in XML data shown in FIG. 7, the ID (JobID tag) of a job during processing by the printing apparatus 110 is "1", and the status (JobState tag) is "Started". "Job 1" is defined as the name (JobName) of Job.

As described in step S504 of FIG. 5, after receiving CreatePrintJob Request, the printing apparatus 110 sets "Started" as the Job status (JobState) for X sec. This indicates that the processing of a job having JobID "1" has just started.

[Transmission/Reception of GetPrinterElements]

Figures 7, 8:
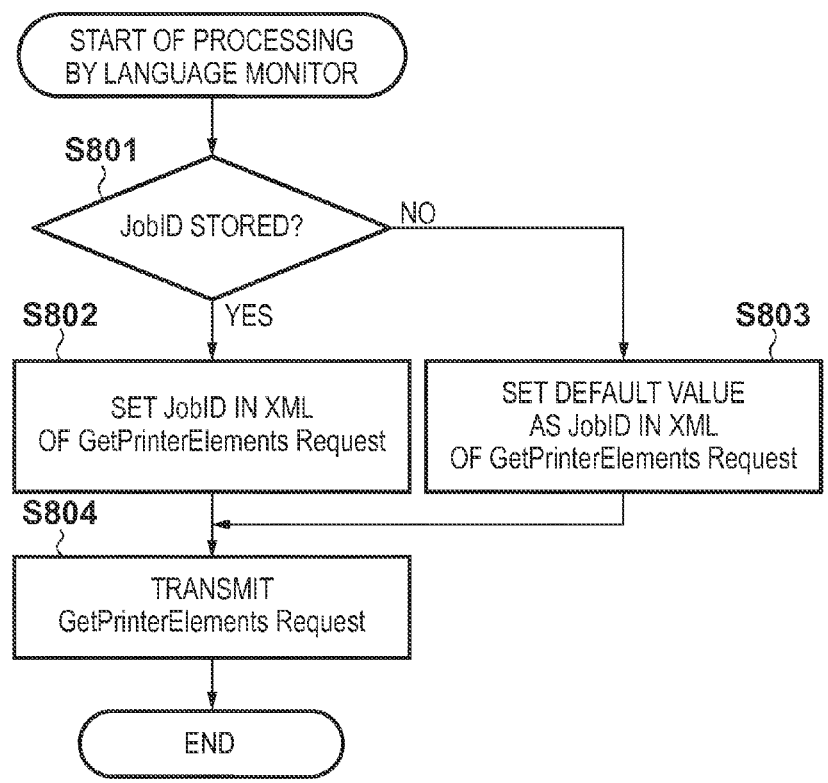
FIG. 7 is a view exemplifying the structure of GetActiveJobs Response.
FIG. 8 is a flowchart showing processing by the language monitor.

FIG. 8 is a flowchart showing processing by the language monitor 208 when the language monitor 208 transmits GetPrinterElements Request to the printing apparatus 110 in the processes 312 and 315 shown in FIG. 3.

After the start of processing, the language monitor 208 checks whether JobID has been stored (step S801). If JobID has been stored (YES in step S801), the language monitor 208 sets the stored JobID in XML data of GetPrinterElements Request (step S802). The language monitor 208 transmits GetPrinterElements Request to the printing apparatus 110 (step S804). The process then ends.

If no JobID has been stored (NO in step S801), the language monitor 208 sets a default value as JobID in XML data of GetPrinterElements Request (step S803). The language monitor 208 transmits GetPrinterElements Request (step S804). Thereafter, the process ends.

Figure 9:
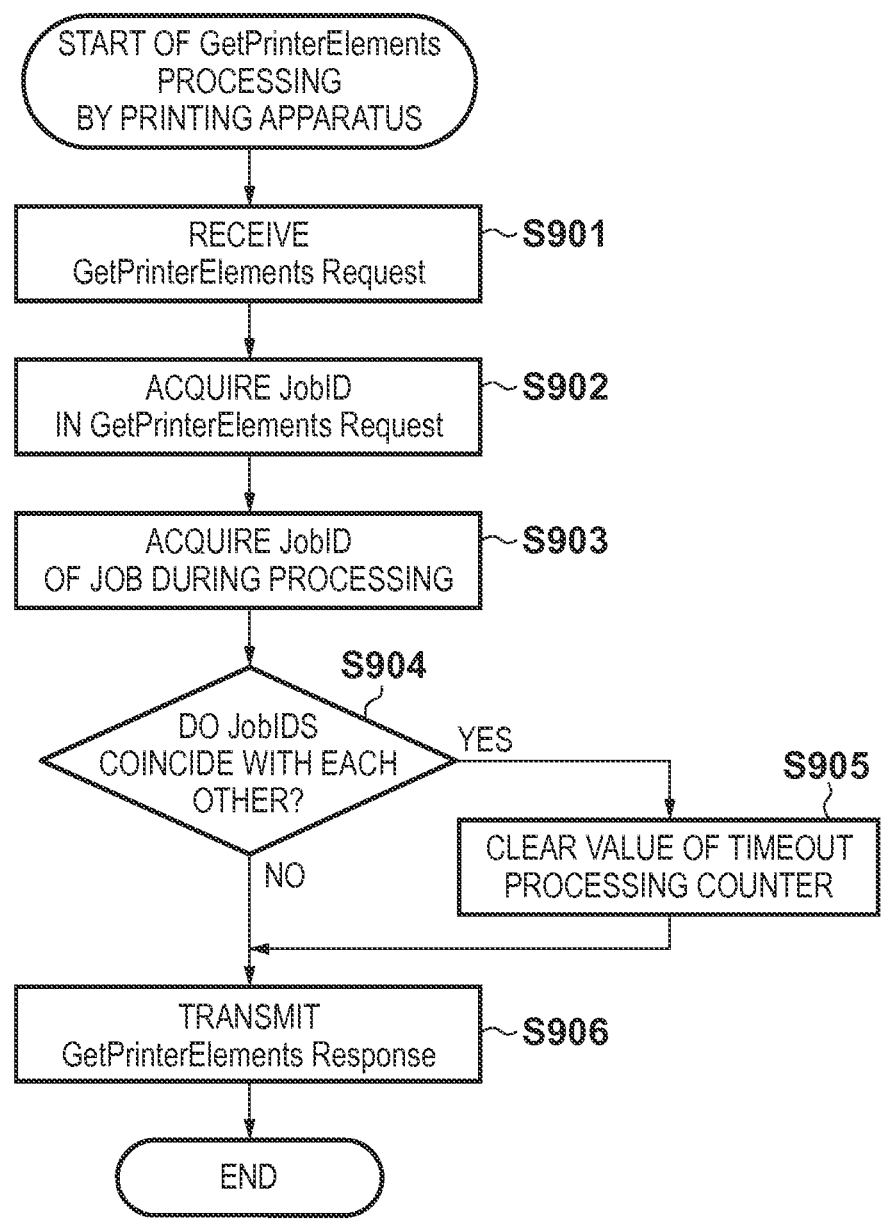
FIG. 9 is a flowchart showing processing by the printing apparatus.

FIG. 9 is a flowchart showing processing by the printing apparatus 110 when the printing apparatus 110 receives GetPrinterElements Request in the processes 312 and 315 shown in FIG. 3.

After the start of processing, the printing apparatus 110 receives GetPrinterElements Request (step S901). The printing apparatus 110 acquires JobID contained in GetPrinterElements Request (step S902). The printing apparatus 110 acquires JobID of the currently processed job (step S903).

The printing apparatus 110 compares the two JobIDs acquired in steps S902 and S903 (step S904). If these JobIDs coincide with each other (YES in step S904), the printing apparatus 110 resets the value of the timeout processing counter (to be referred to as a counter) (step S905). The printing apparatus 110 transmits GetPrinterElements Response to the language monitor 208 (step S906). Then, the process ends.

If these JobIDs do not coincide with each other (NO in step S904), the printing apparatus 110 transmits GetPrinterElements Response to the language monitor 208 without resetting the counter value (step S906). The process then ends.

[Timeout Processing]

In "timeout processing", in order to avoid occupation of the printing apparatus 110, if the information processing apparatus 100 which has transmitted a print job does not access the printing apparatus 110 for a predetermined period, processing of the print job stops, releasing occupation of the printing apparatus 110. The timeout processing will be explained with reference to FIG. 10.

The printing apparatus 110 checks whether the information processing apparatus 100 has accessed it (step S1001). It is determined that access has occurred when the information processing apparatus 100 transmits print data to the printing apparatus 110 or when JobIDs coincide with each other in step S904 of FIG. 9. However, the presence/absence of access may be determined using another condition. If the printing apparatus 110 has been accessed (YES in step S1001), it resets (initializes) the counter value (step S1002). Thereafter, the process ends.

If the printing apparatus 110 has not been accessed (NO in step S1001), it counts the time by incrementing the counter value by one (step S1003). Subsequently, the printing apparatus 110 checks whether the counter value has exceeded the threshold (step S1004). Assume that the threshold used here is defined in advance, and may be properly changeable by the administrator or the like. If the counter value has exceeded the threshold (YES in step S1004), the printing apparatus 110 stops processing of the print job (step S1005). The process then ends.

If the counter value has not exceeded the threshold (NO in step S1004), the process simply ends. The printing apparatus 110 periodically performs this processing until the print job ends.

In the timeout processing, the counter is used as a timepiece unit which measures the elapsed time when no access has occurred. However, a lapse of a timeout time may be managed using another unit (for example, timer).

[Example of Structure of GetPrinterElements]

GetPrinterElements Request (processes 312 and 315 of FIG. 3) to be transmitted from the language monitor 208 and GetPrinterElements Response (processes 313 and 316 of FIG. 3) to be transmitted from the printing apparatus 110 will be explained with reference to FIGS. 11A, 11B, 11C and 11D.

The language monitor 208 transmits GetPrinterElements Request to the printing apparatus 110 to acquire the status of the printing apparatus 110 and prevent timeout processing by the printing apparatus 110 when transmission of print data to the printing apparatus 110 temporarily stops on purpose. For example, when displaying a manual printing guide dialog in manual printing, the language monitor 208 temporarily stops transmission of print data to the printing apparatus 110 on purpose.

The printing apparatus 110 sends back GetPrinterElements Response to the received GetPrinterElements Request. FIGS. 11A and 11B each exemplify the structure of GetPrinterElements Request. GetPrinterElements Request is described in the XML format.

FIG. 11A exemplifies the description of GetPrinterElements Request when the language monitor 208 sets stored JobID in step S802 of FIG. 8. "1" is set in JobID (JobID tag) (description 1100).

FIG. 11B exemplifies the description of GetPrinterElements Request when the language monitor 208 sets a default value as JobID in step S803 of FIG. 8. "Invalid" is set as the default value in JobID (description 1101).

FIGS. 11C and 11D exemplify the structure of GetPrinterElements Response. GetPrinterElements Response describes information about the status of the printing apparatus 110 such as the RAM capacity and ink information of the printing apparatus 110.

Note that the structure of each request/response in the XML format is merely an example, and the present invention is not limited to it.

[Operation when LAN Cable is Plugged out and Plugged in]

The operations of the OS print support function 202, language monitor 208, and printing apparatus 110 when a LAN cable is plugged out from and then plugged in to the information processing apparatus 100 while the printing apparatus 110 prints a job will be explained with reference to FIGS. 12A, 12B, and 12C.

Figure 12A:
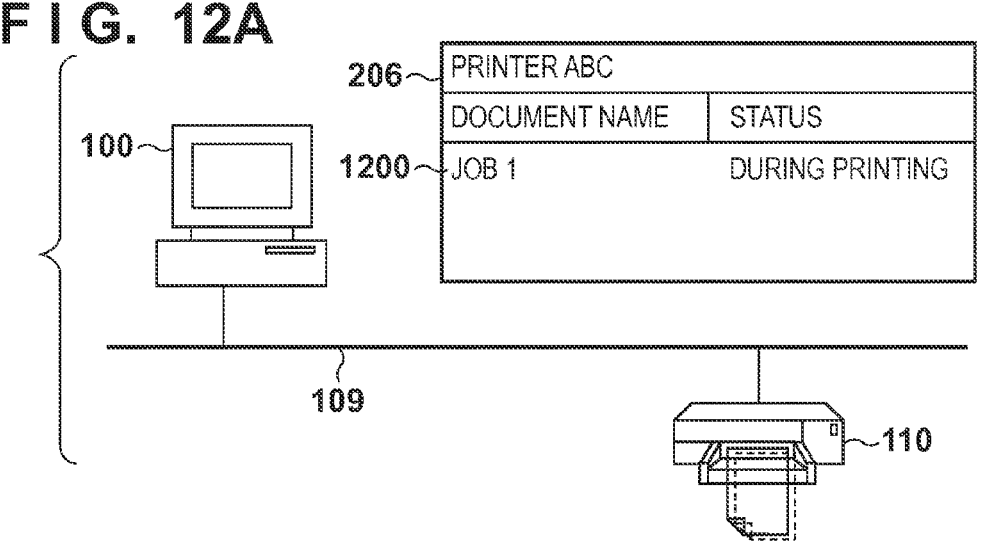
FIGS. 12A, 12B, and 12C are views each showing the statuses of the printing apparatus and print queue in accordance with the connection status of the LAN cable.

FIG. 12A shows the configuration of the information processing apparatus 100 and printing apparatus 110 before the LAN cable is plugged out from the information processing apparatus 100. FIG. 12A also shows a job status represented by the print queue 206 in the information processing apparatus 100. The information processing apparatus 100 and printing apparatus 110 are connected via the network 109, and the printing apparatus 110 is printing job 1. As a status 1200, job 1 during printing exists in the print queue 206 in the information processing apparatus 100.

Figure 12B:
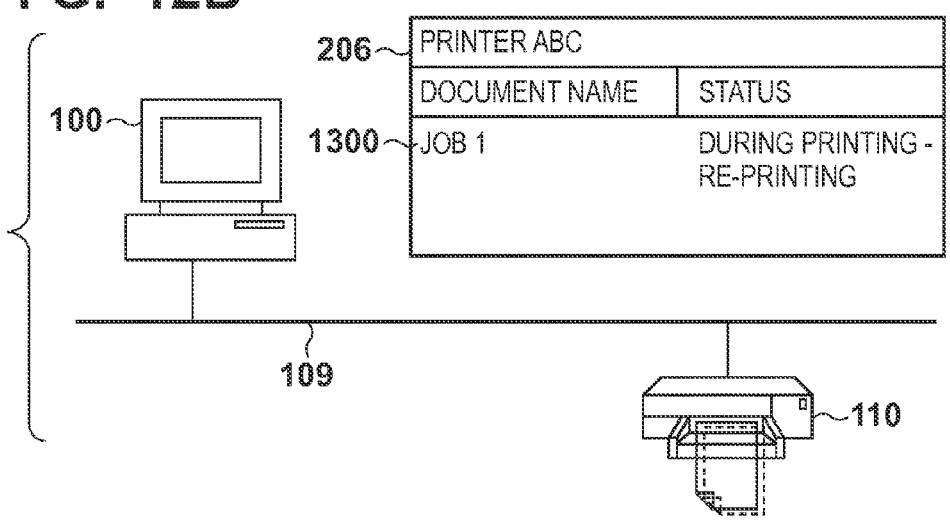

FIG. 12B shows the configuration of the information processing apparatus 100 and printing apparatus 110 when the LAN cable is plugged out from the information processing apparatus 100. FIG. 12B also shows a job status represented by the print queue 206 in the information processing apparatus 100. The information processing apparatus 100 detects the plug-out of the LAN cable, and the OS print support function 202 deletes job 1 in order to print it again (status 1300). At this time, the printing apparatus 110 cannot detect the plug-out of the LAN cable from the information processing apparatus 100, and keeps printing job 1 (status 1200).

Figure 12C:
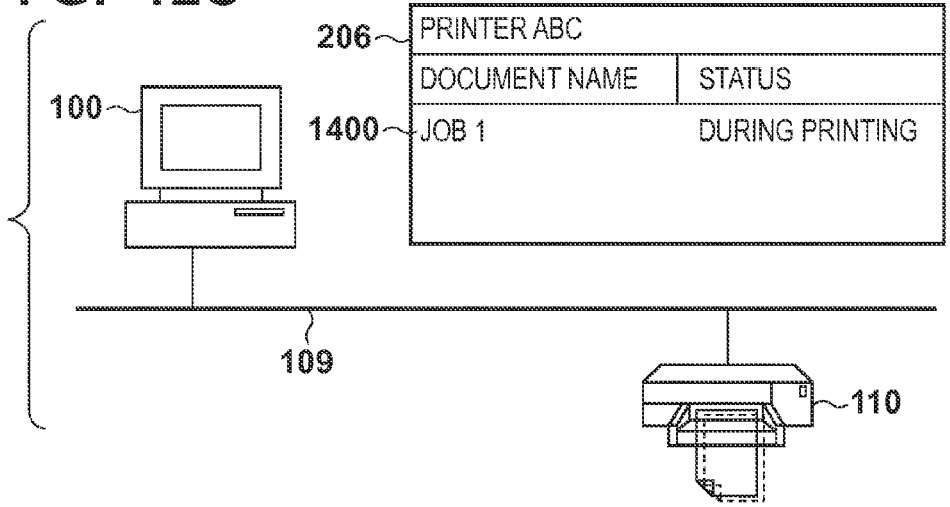

FIG. 12C shows the configuration of the information processing apparatus 100 and printing apparatus 110 when the LAN cable is reconnected to the information processing apparatus 100. FIG. 12C also shows a job status represented by the print queue 206 in the information processing apparatus 100. The information processing apparatus 100 detects that the LAN cable has been reconnected, and the OS print support function 202 prints job 1 again (status 1400). For descriptive convenience, a re-printed job will be referred to as "job 1'" in distinction from job 1 before re-printing. However, the printing apparatus 110 cannot detect the plug-out and plug-in of the LAN cable from and into the information processing apparatus 100, and keeps printing job 1. That is, although the printing apparatus 110 is printing job 1, the information processing apparatus 100 tries to print job 1'.

The spooler 205, language monitor 208, port monitor 209, and printing apparatus 110 start processing of job 1' to be printed again. The spooler 205 sequentially calls functions StartDocPort( ) and WritePort( ) of the language monitor 208 (processes 301 and 302 shown in FIG. 3). The language monitor 208 calls the function WritePort( ) of the port monitor 209, and the port monitor 209 transmits CreatePrintJob Request to the printing apparatus 110 (processes 303 and 304 of FIG. 3). The printing apparatus 110 receives CreatePrintJob Request from the port monitor 209 and starts processing. However, the printing apparatus 110 remains printing job 1, and thus executes the following processing of FIG. 5.

The printing apparatus 110 receives CreatePrintJob Request from the port monitor 209 (step S501), but cannot newly start processing of the job because it keeps printing job 1. Hence, the printing apparatus 110 sets an error in CreatePrintJob Response (YES in step S502→step S506), and transmits it to the port monitor 209 (step S507). The process then ends.

The language monitor 208 fails to call WritePort( ) of the port monitor 209 (process 303 of FIG. 3), and notifies the spooler 205 of the failure (NO in step S602→step S604 in FIG. 6). The spooler 205 repetitively calls WritePort( ) of the language monitor 208 until WritePort( ) of the language monitor 208 is successfully called (process 302 of FIG. 3).

In another thread, the language monitor 208 transmits GetPrinterElements Request corresponding to the process 312 shown in FIG. 3 to the printing apparatus 110. The operation of the language monitor 208 at this time will be explained with reference to FIG. 8. The language monitor 208 checks whether JobID has been stored (step S801). Since no JobID has been stored (NO in step S801), the language monitor 208 sets the default value (Invalid) as JobID in XML data of GetPrinterElements Request (step S803). The language monitor 208 transmits GetPrinterElements Request to the printing apparatus 110 (step S804). The process then ends. The GetPrinterElements Request described at this time has contents shown in FIG. 11B.

The printing apparatus 110 receives GetPrinterElements Request from the language monitor 208 (processes 312 and 315 of FIG. 3). The operation of the printing apparatus 110 at this time will be explained with reference to FIG. 9. The printing apparatus 110 receives GetPrinterElements Request from the language monitor 208 (step S901). The printing apparatus 110 acquires JobID contained in GetPrinterElements Request (step S902). This JobID is "Invalid". The printing apparatus 110 acquires JobID of the currently processed job (step S903). JobID at this time is "1". The printing apparatus 110 compares the two acquired JobIDs. Since these JobIDs do not coincide with each other (NO in step S904), the printing apparatus 110 transmits GetPrinterElements Response to the language monitor 208 (step S906). Thereafter, the process ends.

In accordance with this processing, the printing apparatus 110 does not clear the timeout processing counter. Thus, the printing apparatus 110 executes timeout processing upon the lapse of the timeout time. By performing timeout processing, the printing apparatus 110 stops processing for job 1 during printing, releasing the occupation of the printing apparatus 110 by job 1.

After that, a call for WritePort( ) of the language monitor 208 by the spooler 205 succeeds (process 302 of FIG. 3). The printing apparatus 110 receives CreatePrintJob Request from the port monitor 209 (step S501). At this time, printing of job 1 has ended. Thus, the printing apparatus 110 sets a value indicating the success in XML data of CreatePrintJob Response (step S505), and transmits it to the port monitor 209 (step S507). The printing apparatus 110 starts processing of job 1'.

As described above, the printing apparatus can avoid resetting of the timeout processing counter in response to a status request for a job which is not currently processed by the printing apparatus.

In FIGS. 12A, 12B, and 12C, disconnection and reconnection of the network have been described by exemplifying plug-out and plug-in of the LAN cable. However, the present invention is not limited to a physical network, and is applicable even to a network such as a wireless LAN.

<Second Embodiment>

Figure 13:
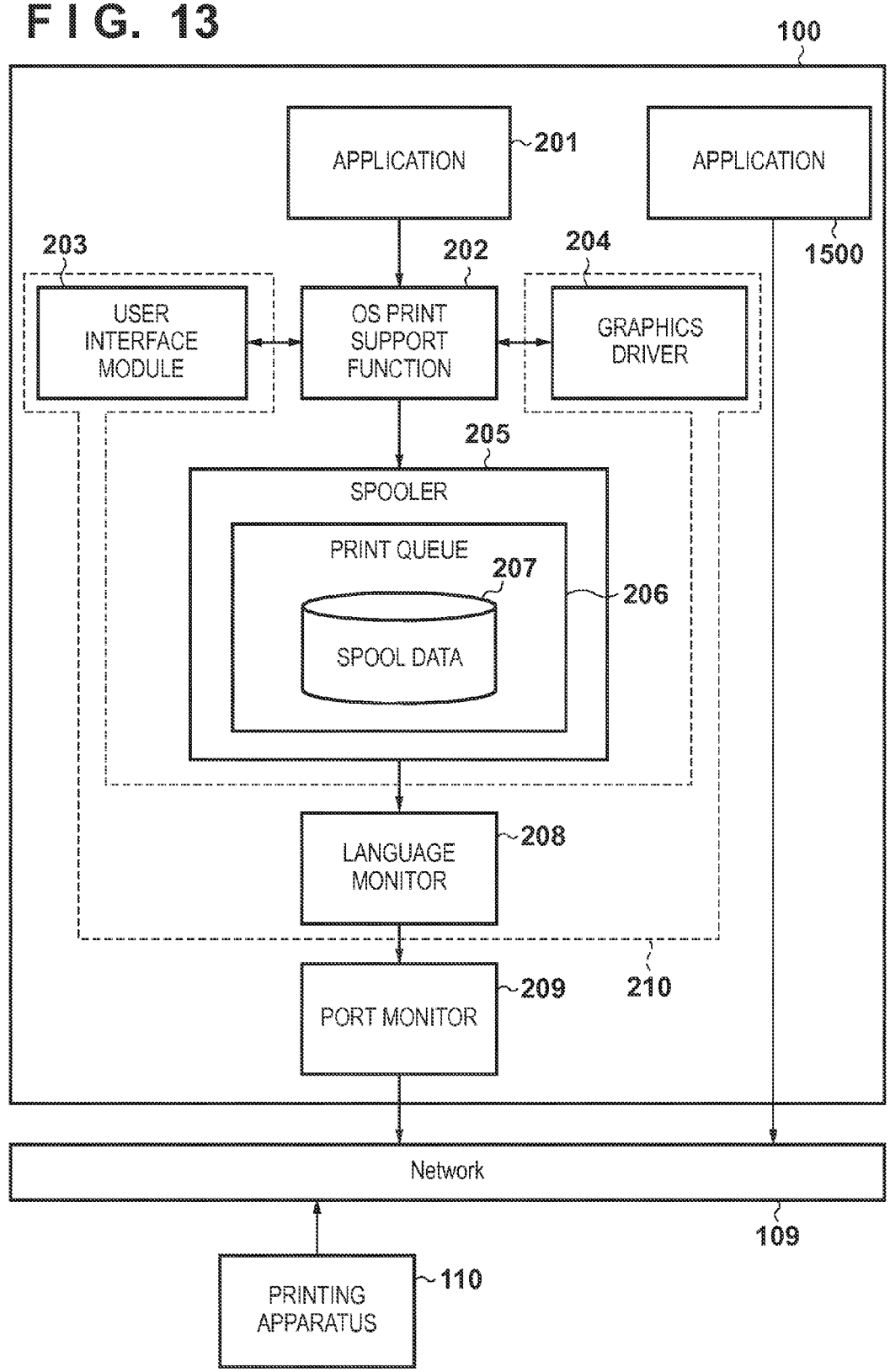
FIG. 13 is a block diagram showing the configuration of a printing system according to the second embodiment.

The second embodiment according to the present invention will be described with reference to FIGS. 13 and 14. In FIG. 13, an application 1500 is newly added to the block diagram of the printing system in FIG. 2. Unlike an application 201, the application 1500 can directly transmit a print job to a printing apparatus 110 without the mediacy of an OS print support function 202.

A case in which the applications 201 and 1500 transmit print jobs to the printing apparatus 110 in the order named will be examined. The application 201 transmits a print job to the printing apparatus 110 via the OS print support function 202 according to the processing described with reference to FIG. 3. In this case, GetPrinterElements Request is periodically transmitted to acquire the status of the print job and prevent timeout processing by the printing apparatus 110.

The printing apparatus 110 assigns "200" as JobID to CreatePrintJob Request from the application 201, and sends back CreatePrintJob Response. Therefore, GetPrinterElements Request to acquire the status of a job printed by the application 201 has contents as shown in FIG. 14A. In this case, "200" is described in JobID (JobID tag value).

The application 1500 transmits CreatePrintJob Request and SendDocument Request directly to the printing apparatus 110 without the mediacy of the OS print support function 202, and causes the printing apparatus 110 to print a desired job. In this case, the application 1500 periodically transmits GetPrinterElements Request to acquire the status of the print job and prevent timeout processing by the printing apparatus 110.

Since the printing apparatus 110 is printing the print job from the application 201, it sends back an error in response to CreatePrintJob Request from the application 1500. In this case, the application 1500 cannot acquire JobID. GetPrinterElements Request to acquire the status of a print job by the application 1500 has contents as shown in FIG. 14B. In this case, "Invalid" is described in JobID (JobID tag value).

Upon receiving GetPrinterElements Request from the application 201 or 1500, the printing apparatus 110 performs the processing described with reference to FIG. 9 in the first embodiment. The printing apparatus 110 compares JobID (step S902) contained in GetPrinterElements Request with JobID (step S903) of a job during processing by the printing apparatus 110 (step S904). Only when these identifiers coincide with each other, the printing apparatus 110 clears the value of the timeout processing counter (step S905).

As described above, when the printing apparatus 110 receives GetPrinterElements Request from the application 201, JobIDs coincide with each other and the printing apparatus 110 clears the value of the timeout processing counter. To the contrary, when the printing apparatus 110 receives GetPrinterElements Request from the application 1500, JobIDs do not coincide with each other and the printing apparatus 110 does not clear the counter value. In this manner, even when the printing apparatus 110 receives GetPrinterElements Response from a plurality of applications in the information processing apparatus 100, it can execute appropriate timeout processing.

For example, when the application 201 or OS print support function 202 crashes owing to some reason while the printing apparatus 110 prints a job from the application 201, the printing apparatus 110 keeps printing the job from the application 201. At this time, even if the printing apparatus 110 receives GetPrinterElements Request from the application 1500, it does not update the counter value because JobIDs do not coincide with each other.

Upon the lapse of the assumed time, the printing apparatus 110 performs timeout processing to stop the job during printing without erroneously updating the timeout processing counter, and can accept a print job from the application 1500.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-035183, filed Feb. 21, 2011, which is hereby incorporated by reference herein in its entirety.

What is claimed is:

1. A printing system comprising a printing apparatus and an information processing apparatus which communicates with said printing apparatus,
   said information processing apparatus comprising a transmission unit configured to transmit a status acquisition request to said printing apparatus, and
   said printing apparatus comprising:
   a timeout processing unit configured to manage a timeout of a job to be processed;
   an identifier acquisition unit configured to acquire an identifier of a job during processing;
   a determination unit configured to determine whether the status acquisition request contains the identifier of the job during processing; and
   a reset unit configured not to reset a lapse of the timeout time of the job by said timeout processing unit when said determination unit determines that the status acquisition request does not contain the identifier of the job, and to reset the lapse of the timeout time of the job by said timeout processing unit when said determination unit determines that the status acquisition request contains the identifier of the job.

2. The system according to claim 1, wherein
   said information processing apparatus further comprises
   an acquisition unit configured to acquire an identifier of a job to be processed by said printing apparatus, and
   a storage unit configured to store the identifier acquired by said acquisition unit, and
   wherein when said storage unit has stored the identifier, said transmission unit transmits, to said printing apparatus, the status acquisition request containing the identifier stored in said storage unit, and when said storage unit has not stored the identifier, said transmission unit transmits, to said printing apparatus, the status acquisition request containing a default value for the identifier.

3. The system according to claim 2, wherein
   while said printing apparatus is processing the job, said information processing apparatus displays information indicating that the job is during processing, and
   when a network cable of said information processing apparatus is plugged out from said information processing apparatus, said information processing apparatus displays information indicating that the job is re-printed.

4. The system according to claim 1, wherein
   said printing apparatus further comprises a setting unit configured to set a status of a job to a status representing that the job has started, for a predetermined time after an identifier of the job is assigned,
   said information processing apparatus further comprises
   a status acquisition unit configured to acquire the status of the job by transmitting a request to obtain the status of the job to be processed by said printing apparatus and the identifier of the job to be processed by said printing apparatus, to said printing apparatus within the predetermined time after a print start request of the job to be processed by said printing apparatus is transmitted to said printing apparatus, and
   a status determination unit configured to determine whether the status of the job that is acquired by said status acquisition unit is a status which is set by said setting unit and to represent that the job has started, and
   wherein when said status determination unit determines that the status of the job is the status representing that the job has started, said storage unit stores the identifier of the job to be processed by said printing apparatus.

5. The system according to claim 1, wherein
   said information processing apparatus further comprises a management unit configured to manage a job to be processed by said printing apparatus,
   wherein when a network cable of said information processing apparatus is plugged out from said information processing apparatus, the job to be processed managed by the management unit is deleted, and when the network cable is reconnected to said information processing apparatus, a re-print job is issued.

6. A printing apparatus comprising:
   a timeout processing unit configured to manage a timeout of a job to be processed;
   an identifier acquisition unit configured to acquire an identifier of a job during processing;
   a determination unit configured to determine whether a status acquisition request transmitted from an information processing apparatus contains the identifier of the job during processing; and
   a reset unit configured not to reset a lapse of the timeout time of the job by said timeout processing unit when said determination unit determines that the status acquisition request does not contain the identifier of the job, and to reset the lapse of the timeout time of the job by said timeout processing unit when said determination unit determines that the status acquisition request contains the identifier of the job.

7. The apparatus according to claim 6, further comprising a setting unit configured to set a status of a job to a status representing that the job has started, for a predetermined time after an identifier of the job is assigned.

8. A non-transitory computer-readable medium storing a program for causing a computer to function as
   a timeout processing unit configured to manage a timeout of a job to be processed,
   an identifier acquisition unit configured to acquire an identifier of a job during processing,
   a determination unit configured to determine whether a status acquisition request transmitted from an information processing apparatus contains the identifier of the job during processing, and
   a reset unit configured not to reset a lapse of the timeout time of the job by said timeout processing unit when said determination unit determines that the status acquisition request does not contain the identifier of the job, and to reset the lapse of the timeout time of the job by said timeout processing unit when said determination unit determines that the status acquisition request contains the identifier of the job.

* * * * *